July 14, 1925.
W. G. LAIRD
1,546,345
PROCESS AND APPARATUS FOR THE TREATMENT OF SUBSTANCES WITH HEAT
Filed March 25, 1920
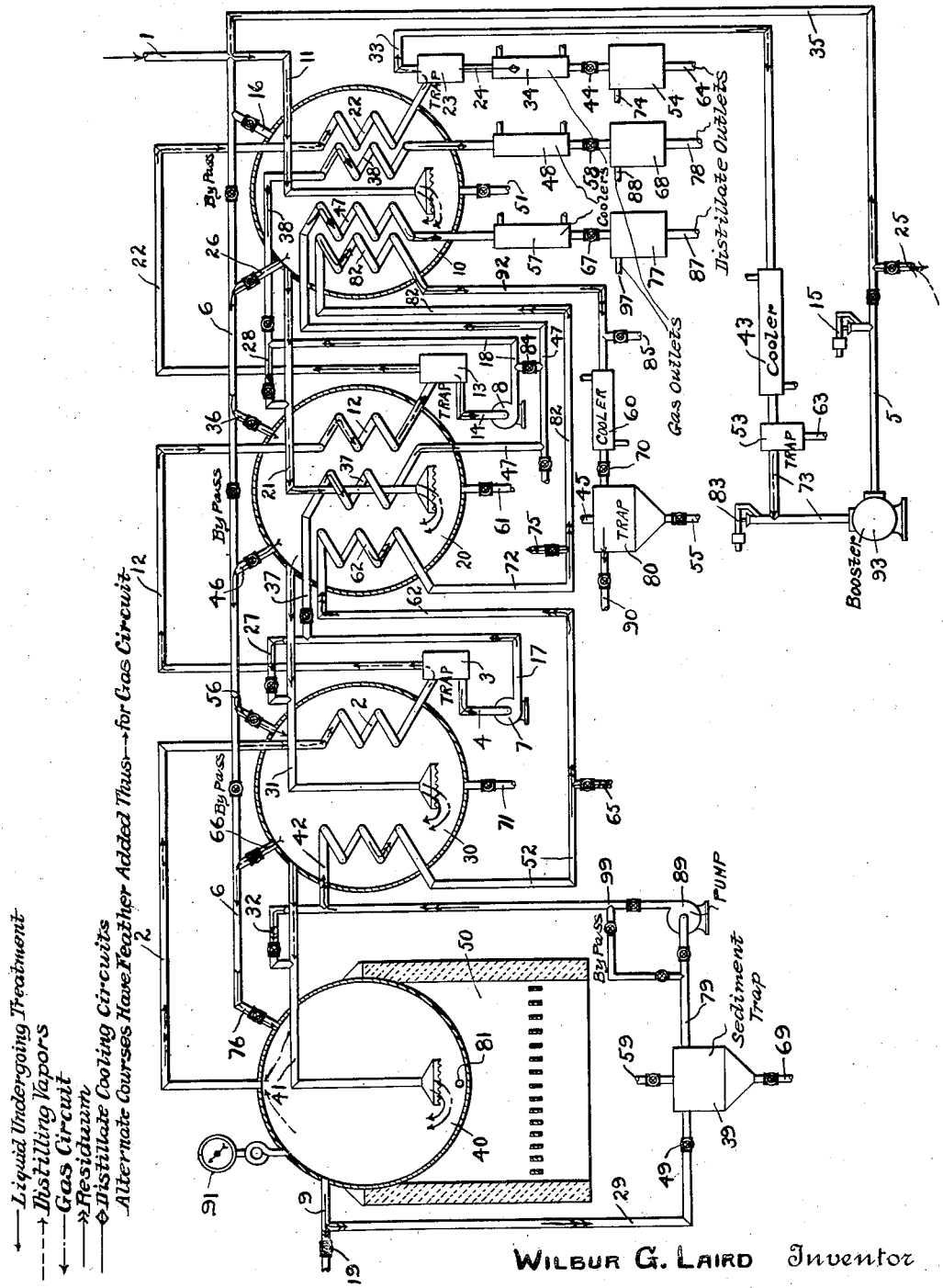
WILBUR G. LAIRD Inventor
By his Attorneys
Prindle, Wright and Small.

Patented July 14, 1925.

1,546,345

UNITED STATES PATENT OFFICE.

WILBUR G. LAIRD, OF NEW YORK, N. Y.

PROCESS AND APPARATUS FOR THE TREATMENT OF SUBSTANCES WITH HEAT.

Application filed March 25, 1920. Serial No. 368,732.

REISSUED

*To all whom it may concern:*

Be it known that I, WILBUR G. LAIRD, a citizen of the United States, residing at New York, in the county of New York and State of New York, have invented a certain new and useful Process and Apparatus for the Treatment of Substances with Heat, of which the following is a specification.

My invention relates to a process and apparatus for the treatment of substances with heat and has for its object to secure a maximum uniformity of heat treatment at minimum expense and with a maximum yield of desired products. The invention is applicable, generally speaking, to all degrees of heat and to all degrees of pressure or lack of pressure to which the substance to be treated can be subjected.

The invention will be illustrated by pointing out the manner in which one embodiment thereof may be applied to the treatment of a washing or absorbing menstrum such as oil which may be used first to absorb desired products such as gasoline or other vapors or gases from a gaseous medium such as natural gas or casing-head gas in which they are contained and then treated in a manner to remove such absorbed products by treatment with heat and in a manner to secure a high degree of thermal efficiency with a maximum separation and recovery of the absorbed products and the menstrum.

The use of this illustrative embodiment is not intended to limit the invention to said embodiment as the invention is applicable to many other uses, among which may be mentioned the changing of the molecular formation of a substance as in the cracking of liquid hydrocarbons to produce other hydrocarbons of different molecular structure. Such molecular change may be either exothermic or endothermic or in complex reactions both may accur in the process. The invention is applicable also to the distillation of substances such as tars or oils which may be composed of a series of more or less complex hydrocarbons having different boiling points and which may yield two or more desired distillates or fractions in the distillation process. The invention is applicable also to the distillation of substances such as water to secure a desired distillate or to secure a concentration of a solution by the removal of a volatile portion thereof or both.

The invention is applicable also to the treatment of substances to secure chemical combination which may be induced by heat or heat and pressure or lack of pressure or the invention may be employed to secure precipitation similarly induced or the desired result may be obtained by heat or heat and pressure or lack of pressure in the presence of a suitable circulating medium introduced or formed in the process and which will serve to aid in the desired result as for example by combining therewith or by serving in a catalytic capacity or aiding otherwise.

The invention is applicable also to the treatment of substances in a manner to secure a distillate condensed in a desired medium, such as for example water vapor condensed in an air medium to produce a distillate more or less "aerated".

The invention is applicable also to the separation of immiscible liquids, such as for example emulsions of oil and water, which may be treated in a manner to secure their separation by partial or complete distillation of one or more constituents or the desired degree of separation may be obtained by precipitation or both.

The above examples of the applicabilty of the invention are not intended as limitative or as including all uses of the inventon, but are intended merely as illustrative of some of the uses for which the invention may be adapted.

The invention results in more uniform heat treatment and with a maximum yield of desired products with a minimum expense and loss of heat. This is obtained as stated broadly by a progressive saturation of a circulating medium (either introduced or formed during the process) with the desired products. The circulating medium is saturated progressively as it passes through progressively heated chambers containing the substance under treatment with increased quantities of desired products and enters each succeeding chamber lacking the products which it receives therein thus creating a condition which it is believed facilitates the formation of the desired products in each said successive chamber. In this connection it is possible that a circulating medium may be employed that will aid in the process through absorption, mass action, chemical combination, or catalytic action with the substance under treatment or the desired products or both and produce more desirable products than otherwise would be obtained. It is possible also that a circulating medium containing undesirable products may be used in certain embodiments of the invention to aid in preventing the formation of similar products during the process and that in some cases a polymerization or a combining may take place which will increase the yield of desired products by the combining of undesirable products to form desirable products. Loss of heat preferably is minimized by utilizing the heat at least in part usually wasted in condensation to heat at least in part the substance to be treated which in turn acts to cool at least in part the products containing by the heat treatment. Similarly the heat of the liquid products or residuum or both may be utilized at least in part to heat at least in part the substance to be treated which in turn acts to cool at least in part the liquid products or residuum or both. Loss of heat may be minimized also by returning one or more undesired condensed products to the substance being treated preferably at a stage of the process approximately corresponding in temperature with the temperature of the condensed product.

It will be evident that the substance will be able to utilize the latent heat of the vapor, as well as the heat from any condensate or residuum passed through or into it, because the rapid evaporation of the substance induced by the circulating medium will exercise such a cooling effect as to enable the substance to utilize what otherwise would pass off as excess heat. For example, a pound of steam contains enough latent heat to raise approximately six and one-third pounds of water from 60° F. to 212° F. If, therefore, it was desired to transfer all the latent heat of a pound of steam to less than six and one-third pounds of water, it would be necessary to convey the heat away from the water or the excess latent heat could not be transferred. By inducing a rapid evaporation of the water (evaporation being one of the objects sought in the present process) the heat is conveyed away from the water which thus is rendered capable of taking up all the latent heat. The more heat, the more evaporation; the more evaporation the more heat can be taken up; and the more evaporation from a minimum amount of added or applied heat, the more successful and economical the process and apparatus is.

Other and further objects of the invention will be apparent from the following illustration of certain embodiments thereof and from the accompanying drawing, in which The figure shows a diagrammatic illustration of one embodiment of the invention.

Referring to the embodiment of said figure, a series of chambers 10, 20, 30, and 40 in any desired number and without particular limitation as to form is illustrated, the last of which is shown as heated by a furnace 50. Although heat may be applied in any desired manner and to other chambers, it should preferably not exceed an amount sufficient to compensate for heat losses, thus permitting condensation of the products at least in part and similar cooling of such products or residuum or both as may be desired.

The substance to be treated may be introduced by a pipe 1 connected to a pipe 11 which preferably discharges at a point below the normal liquid level of the substance to be treated in first chamber 10. A similar pipe 21 leads from chamber 10 to chamber 20, a similar pipe 31 leads from chamber 20 to chamber 30, and a similar pipe 41 leads from chamber 30 to chamber 40.

The exit of pipes 11, 21, 31, and 41 may be of any desired shape or form, a conventional distributor being shown in drawing. The exits may be submerged to any desired depth in the substance undergoing treatment or may be above the normal liquid level if desired, but in the illustrative embodiment the exit of the pipes 11, 21, 31, and 41 is shown as submerged below the normal level of the substance being treated.

The gaseous products accumulating in chamber 40 are conveyed therefrom by a pipe 2 which assumes any desired form in chamber 30 sufficient to afford desired condensing and heating surface therein (a conventional coil being shown merely as a simple illustrative form) and then enters a trap or separator 3 from which the liquid distillate may be removed by a pipe 4 and the gaseous products by a pipe 12 which enters chamber 20 and leads to trap 13 with distillate removal pipe 14 and gaseous products removal pipe 22 which enters chamber 10 and leads to trap 23 having distillate removal pipe 24.

From trap 23 the gaseous products enter pipe 33 which passes preferably through a condenser 43 into trap or separator 53 having distillate removal pipe 63. The gaseous products may be conducted from trap 53 by pipe 73 provided with a blow-off 83 and with a booster 93, by means of which latter the gaseous products or any desired portion thereof may be conducted to pipe 5 with blow-off 15 and branch pipe 25 through which any desired circulating medium may be introduced if desired. From pipe 5 the gaseous products may be conducted to pipe 35 leading into pipe 1. Blow-offs 83 and 15 may be set at any desired pressure. When it is not desired to recirculate the circulating medium or gaseous products or any portion thereof blow-off valve 83 may be utilized to release the used circulating medium which may be conserved if desired and the new medium may be introduced as by pipe 25 or any other desired manner. When it is desired to employ the process with pressures below atmospheric pressure, booster 93 may be operated as an exhauster in connection with blow-off 15 and the gaseous medium or products or any portion thereof may be released through blow-off 15 or may be returned for recirculation through pipes 5 and 35. Pipe 25 may be utilized if desired to supply a new circulating medium or any desired portion thereof. All or any portion of the discharge products released through the blow-off or otherwise may be conserved if desired and similarly any portion of the circulating medium lost or utilized in the process may be made up in any desired manner.

If it is desired to pass the gaseous medium from pipe 1 over the substance to be treated without bubbling therethrough, any desired construction may be used such, for example, as a by-pass pipe 6 with connecting pipes 16 and 26 and provided with suitable valves. This construction, in connection with similar connecting pipes 36, 46, 56, 66, and 76 and similar or suitable valves connecting with the other chambers permits all or any portion of the lighter constituents to by-pass any chamber or chambers or pass through such chamber or chambers without bubbling through the heavier constituents therein contained as when they pass through pipes 11, 21, 31, or 41. The distillate from trap or separator 3 may be conducted by means of pipe 4 to pump 7 and discharged into pipe 17 from which all or any portion thereof may be returned to the substance to be treated as by means of pipe 27 leading into pipe 31 and provided with a suitable valve as indicated or all or any portion of the said distillate may be conducted through chamber 20 by pipe 37 which may assume any desired form therein to provide desirable cooling and heating surface in chamber 20 (a conventional coil being shown merely as a simple illustrative form) thence by means of pipe 47 through chamber 10 in similar manner to cooler 57 where it may be further cooled if desired. From cooler 57 the distillate may be conducted through valve 67 to chamber 77 provided with distillate removal pipe 87 and gaseous product removal pipe 97 where the pressure (if pressure is employed) may be removed and the distillate freed of any excess gases or vapors which it may have obtained while under the conditions of pressure employed. The distillate and gaseous products so removed may be conserved or further treated or all or any portion of either or both may be returned to the substance to be treated or to the circulating medium.

The distillate from trap or separator 13 may be conducted in similar manner through pipe 14 to pump 8 and discharged into pipe 18 from which all or any portion thereof may be returned to the substance to be treated as by means of pipe 28 leading into pipe 21 provided with suitable valve as shown or all or any portion of the said distillate may be conducted through chamber 10 by pipe 38 to cooler 48 where it may be cooled further if desired. From cooler 48 the distillate may be conducted through valve 58 to chamber 68 provided with distillate removal pipe 78 and gaseous product removal pipe 88 where the pressure (if pressure is employed) may be removed and the distillate freed of any excess gases or vapors which it may have obtained while under the conditions of pressure employed. The distillate and gaseous products so removed may be conserved or further treated or all or any portion of either or both may be returned to the substance to be treated or to the circulating medium.

In similar manner the distillate from trap or separator 23 may be conducted by pipe 24 through cooler 34 and further cooled if desired thence through valve 44 to chamber 54 provided with distillate removal pipe 64 and gaseous product removal pipe 74. Similarly the distillate and gaseous products removed may be conserved or further treated or all or any portion of either or both may be returned to the substance to be treated or to the circulating medium.

In the illustrative embodiment shown in the drawing a by-pass with suitable control valve 84 is provided to connect pipes 47 and 18 and permit the distillates from traps or separators 3 and 13 to be combined either wholly or in part during the process. In some instances the combining of two or more distillates during the process may be desired and may be accomplished in the above described or any other suitable manner.

It will be obvious to those skilled in the art that the condensate resulting from cooling the gaseous products need not be removed necessarily from the presence of the remaining gaseous products until so desired, the traps or separators shown in the drawings being illustrated merely of a well known means of such removal and not indicative of the necessity of such removal at the points indicated. The points of distillate removal are selective and should be governed preferably by the adaption of the process.

Chamber 40 is provided with a residuum outlet as by pipe 9 with valve 19 through which all or any portion of the residuum may be removed if desired either continuously or intermittently. Pipe 9 may connect also with pipe 29 leading to sediment trap or filter 39. The filter or trap 39 may be used as a pressure release chamber in connection with a valve 49 (if pressure is employed) and gaseous products resulting from lowered pressure may be removed if desired by a pipe 59 for further treatment or use. The chamber 39 may be provided with a drain pipe 69. The residuum leaving trap or filter 39 may be conducted by a pipe 79 to a pump 89 and discharged into pipe 99 from which all or any portion thereof may be returned to the substance to be treated as by means of pipe 32 leading into pipe 41 and provided with suitable valve as shown, or all or any portion of the said residuum may be conducted through chamber 30 by pipe 42 which may assume any desired form therein to provide desirable cooling and heating surface in chamber 30 (a conventional coil being shown merely as a simple illustrative form) and may be conducted therefrom by pipe 52. In similar manner the residuum may be conducted by pipes 62, 72, 82, and 92 through chambers 20 and 10, respectively, and may be further cooled if desired by a suitable cooler 60 through which the residuum may pass. From cooler 60 the residuum may be released from pressure (if pressure is employed) as by means of valve 70 and discharged into chamber 80 having gaseous products removal pipe 45 and drain pipe 55. Chamber 80 may be employed as a sediment trap of filter if desired and the rectified product may be conducted therefrom by a pipe 90 and re-used as an absorbing menstrum or otherwise used as desired or all or any portion thereof may be returned to inlet pipe 1 and retreated if desired. Branch pipes 65, 75, and 85 may be provided in pipes 52, 72, and 92, respectively, for removal of all or any portion of the residuum therein contained if desired and similar means may be adopted to remove one or more distillates or any desirable portions thereof at suitable stages of the process if so desired.

The pipe 35 which has been described in the embodiment illustrated above as conveying a gaseous medium to the circuit is intended to act as a conveyor for any desired circulating medium which may be either the gaseous products from booster 93 or an introduced gaseous medium or an introduced liquid (which may provide a gaseous medium while in the circuit) or both in any combination that will provide a desired circulating medium. In said embodiment for example a liquid containing volatile products which are adapted to become a gaseous circulating medium during the course of the circuit may be utilized in whole or in part. The circulating medium may be of a nature foreign to the substance treated, may unite chemically therewith, may be composed of the same chemical elements as the substance, may be of a catalytic nature, and/or may be miscible or immiscible with the substance. The circulating medium also may be of a nature advantageous to be incorporated in the distillate or any portion thereof. In treating a substance which contains volatile products in sufficient quantity to provide a suitable gaseous circulating medium during the treatment it preferably is introduced directly through pipes 1 and 11 without the utilization of pipe 35, except if desired as a conveyor for surplus gases available after the circuit is completed. In other words, it is the purpose to employ a gaseous medium traveling through the circuit either bubbling through the substance under treatment or passing adjacent the surface thereof which will travel through the circuit and aid in the formation of desired products and in some instances become progressively saturated therewith, both the circulating medium and the products given off being subjected to progressive heat treatment. It will be noted that the circulating medium travels in the same general direction as the substance to be treated and that the heating is progressive. At the same time and at different stages part of the gaseous products may be cooled to the condensing point by passing them in a generally reverse direction through the chambers and in a similar manner distillates or residuums or both either wholly or in part may be cooled also. As the gaseous products, the distillates, and the residuums give up their heat retrogressively the heat is taken up progressively by the substance to be treated and the circulating medium traveling in the opposite direction or forward in the illustrative embodiment. The result is an economy of heat not attained heretofore. The substance to be treated and the circulating medium are heated and the gaseous products, distillates, and residuums obtained by such heat treatment are cooled at least in part by bringing them through successive stages within the respective heating and cooling influence of each other while physically separated.

Chamber 40 is shown as equipped with a pressure gauge 91 for determining the pressure and proper adjustments of the blow-offs. Other suitable gauges may be provided to indicate pressures and liquid levels at desirable stages of the process in any well known manner and as readily will be understood by those skilled in the art but which have not been particularly shown in the drawing. Insulation, clean outs, and minor details of similar character also have been omitted for the sake of clearness of illustration.

It will be understood that when the pressures employed in the process are sufficient to cause flow of the residuum and distillates through the course desired the pumps 89, 7, and 8 may be omitted and that suitable relative positions of the apparatus employed may be utilized to enable all or any portion of the distillates to be returned in suitable manner to the substance to be treated without the aid of pumps.

Chambers 10, 20, 30, and 40 may be provided with valve controlled outlets 51, 61, 71, and 81, respectively, for draining or other purposes or for drawing off heavier constituents of substances such as emulsions which may be separated at certain stages of the process and said constituents may be cooled if desired by means similar to that above described for cooling distillates and residuum and by providing suitable cooling and heating surface therefor.

The distillates or any portion thereof and all or any portion of the residuum may be cooled by contact with the substance to be treated while physically separated therefrom in any desired manner and to any desired extent and may pass through one or more of the chambers as desired.

Many modifications of my invention will be apparent to those skilled in the art without departing therefrom or from the scope of the claims, my invention not being limited to the embodiment thereof chosen for illustrative purposes but consisting of the treatment of substances with heat adapted to obtain improved results with increased economies.

What I claim and desire to secure by Letters Patent is:

1. A method of heat treating liquids comprising mixing a given liquid with gas, passing said mixture forward to a zone of maximum temperature, withdrawing vapors from said zone, passing said vapors countercurrent to said mixture and in heat interchange relation therewith to form a zone through which said mixture passes of less temperature than said first zone and thereby forming a condensate from part of said vapors, and mingling said condensate with said mixture in said second mentioned zone of temperature.

2. A method of heat treating liquids comprising mixing a given liquid with a fluid, heating said mixture to gasify the fluid, passing said gas-liquid mixture forwardly to a zone of maximum temperature, withdrawing vapors from said zone, passing said vapors countercurrent to said mixture and in heat interchange relation therewith to form a zone through which said mixture passes of less temperature than the first zone and thereby forming a condensate from part of said vapors and mingling said condensate with said mixture in said second mentioned zone of temperature.

3. A method of heat treating liquids comprising mixing a liquid with gas, passing said mixture forward to a zone of maximum temperature, withdrawing vapors from said zone and passing said vapors countercurrent to said mixture and in heat interchanging relation therewith to form a plurality of zones through which said mixture passes, said second mentioned zones being of less temperature than said first mentioned zone and increasing in temperature in the direction of flow of said mixture, collecting the condensate from one of said zones and mingling it with said mixture in a zone having at least as high degree of temperature as that in which the condensate itself was formed, and passing vapors not condensed in the hotter of said zones successively through the zones of lower temperature.

4. A method of heat treating liquids comprising providing a given liquid with a gasifiable fluid, heating said liquid-fluid mixture to gasify and vaporize the same, passing said gas-vapor liquid mixture forwardly to a zone of maximum temperature, withdrawing vapors from said zone and passing said vapors countercurrent to said mixture and in heat interchange relation therewith to form a plurality of zones of decreasing temperature in the direction of flow of said vapors, collecting a condensate from one of said zones, mingling a part of said condensate with said mixture in a zone having at least a temperature equal to the zone in which the condensate was formed, and passing the remainder of said condensate through a zone of less temperature than that in which it was formed while maintaining the condensate separate from both said mixture and said vapors.

5. A method of heat treating liquids comprising mixing a given liquid with gas, passing said mixture forward to a zone of maximum temperature, withdrawing vapors from said zone and passing said vapors countercurrent to said mixture and in heat interchange relation therewith to form a plurality of zones of decreasing temperature in the direction of flow of said vapors, collecting a condensate from one of said zones, mingling a part of said condensate with said mixture in a zone having at least a temperature equal to the zone in which the condensate was formed, and passing the remainder of said condensate through a zone of less temperate than that in which it was formed while maintaining the condensate separate from both said mixture and said vapors.

6. An apparatus of the type described comprising in combination a heating unit, a series of heat interchange units, means for feeding a mixture of gas and liquid through said interchange units to said heating unit, coils in said interchange units, means for passing vapors from said heating unit through certain of said coils to form condensates from said vapors, means for trapping out condensates from uncondensed vapors, and pumps for forcing condensate through coils in certain of said interchange units of lower temperature than those in which the condensate was formed.

7. An apparatus of the type described comprising in combination a heating unit, a plurality of heat interchange units, coils in said interchange units, means for forming a mixture of gas and liquid to be treated and for passing said mixture through said interchange units in series to said heating unit, means for passing vapors from said heating unit through certain of said coils, and pumping means for passing residuum from said heating unit to other of said coils.

8. An apparatus of the type described comprising in combination a heating unit, a plurality of heat interchange units, said interchange units containing coils, means for forming a mixture of gas and liquid to be treated and for passing said mixture through said heat interchange units in series to said heating unit, means for passing vapors from said heating unit through coils in said interchange units, means for trapping out condensates formed in said coils, and pumps for forcing said condensates through other of said coils.

9. An apparatus of the type described comprising in combination a heating unit, a plurality of heat interchange units, coils within said interchange units, means for forming a mixture of gas and liquid to be treated, a pipe for introducing said mixture into the first of said interchange units, pipes for leading mixed liquid and gas from said first interchange unit to another, and thence to said heating unit, a pipe for leading vapors from said heating unit to one of said coils, a pipe for conducting condensate from said last mentioned coil to another of said coils in another interchange unit, and a by-pass from said last mentioned pipe to one of said pipes for conducting mixture intermediate the heat interchange units.

10. An apparatus of the type described for heat treating liquids comprising in combination a heating unit, a series of heat interchangers, means for passing liquid through said heat interchangers in series and to said heating unit, means for passing vapors from said heating unit through said heat interchangers countercurrent to said liquid and thereby forming condensates, means for transferring some of said condensates into said liquid passing to said heating unit, and means for passing a gaseous medium through the mixture of said liquid and said condensate while in one of said heat interchangers to lower the evaporation temperature therein.

In testimony that I claim the foregoing, I have hereunto set my hand this 24th day of March, 1920.

WILBUR G. LAIRD.